United States Patent
Stoia et al.

(10) Patent No.: US 9,243,507 B2
(45) Date of Patent: Jan. 26, 2016

(54) LATE LEAN INJECTION SYSTEM TRANSITION PIECE

(75) Inventors: Lucas John Stoia, Taylors, SC (US); Patrick Benedict Melton, Horse Shoe, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1018 days.

(21) Appl. No.: 13/346,054

(22) Filed: Jan. 9, 2012

(65) Prior Publication Data
US 2013/0174561 A1    Jul. 11, 2013

(51) Int. Cl.
*F23R 3/28* (2006.01)
*F01D 9/02* (2006.01)
*F23R 3/34* (2006.01)
*F02C 7/22* (2006.01)

(52) U.S. Cl.
CPC ............... *F01D 9/023* (2013.01); *F23R 3/346* (2013.01); *F02C 7/222* (2013.01); *F23R 3/283* (2013.01); *F23R 3/286* (2013.01); *F23R 2900/03044* (2013.01)

(58) Field of Classification Search
CPC .......... F02C 7/22; F02C 7/222; F02C 7/2365; F23R 3/00; F23R 3/002; F23R 3/02; F23R 3/16; F23R 3/18; F23R 3/20; F23R 3/28; F23R 3/283; F23R 3/286; F23R 3/34; F23R 3/346; F23R 3/60
USPC ........................................................ 60/752
See application file for complete search history.

(56) References Cited

U.S. PATENT DOCUMENTS

| | | | | |
|---|---|---|---|---|
| 4,872,312 | A | * | 10/1989 | Iizuka et al. ................... 60/760 |
| 5,054,280 | A | * | 10/1991 | Ishibashi et al. ............... 60/776 |
| 5,826,429 | A | * | 10/1998 | Beebe et al. ................... 60/723 |
| 6,047,550 | A | * | 4/2000 | Beebe ............................ 60/737 |
| 6,868,676 | B1 | * | 3/2005 | Haynes .......................... 60/776 |
| 7,082,770 | B2 | * | 8/2006 | Martling et al. ............... 60/796 |
| 7,640,752 | B2 | * | 1/2010 | Gautier et al. ................. 60/796 |
| 7,707,835 | B2 | * | 5/2010 | Lipinski et al. ................ 60/752 |
| 7,926,283 | B2 | * | 4/2011 | Byrne et al. ................... 60/752 |
| 2001/0049932 | A1 | * | 12/2001 | Beebe ......................... 60/39.06 |
| 2002/0189260 | A1 | * | 12/2002 | David et al. ................... 60/746 |

(Continued)

FOREIGN PATENT DOCUMENTS

CN    101555833 A    10/2009

OTHER PUBLICATIONS

Unofficial English Translation of Chinese Office Action issued in connection with corresponding CN Application No. 201310007383.0 on Jul. 27, 2015.

*Primary Examiner* — Phutthiwat Wongwian
*Assistant Examiner* — Michael B Mantyla
(74) *Attorney, Agent, or Firm* — Dotity & Manning, PA

(57) ABSTRACT

A late lean injection system transition piece includes a flow-sleeve interface extending circumferentially around a transition interior. Also included is an impingement sleeve mounting surface extending circumferentially around the transition interior. Further included is a plurality of fuel injectors integrated substantially within the transition piece and disposed between the flowsleeve interface and the impingement sleeve mounting surface. Yet further included is an inner surface extending circumferentially around the transition interior, wherein the inner surface is spaced radially inward of the flowsleeve interface and the impingement sleeve mounting surface.

20 Claims, 2 Drawing Sheets

(56) References Cited

U.S. PATENT DOCUMENTS

| | | |
|---|---|---|
| 2005/0050902 A1* | 3/2005 | Anichini et al. ............... 60/800 |
| 2009/0071159 A1* | 3/2009 | Parker et al. ................... 60/747 |
| 2009/0084082 A1* | 4/2009 | Martin et al. ............. 60/39.281 |
| 2009/0249791 A1 | 10/2009 | Belsom |
| 2010/0018208 A1* | 1/2010 | Ritland ........................... 60/737 |
| 2010/0018209 A1* | 1/2010 | Ramier et al. ................. 60/740 |
| 2010/0018210 A1* | 1/2010 | Fox et al. ....................... 60/746 |
| 2010/0071376 A1* | 3/2010 | Wiebe et al. ................... 60/740 |
| 2010/0077761 A1* | 4/2010 | Johnson et al. ................ 60/752 |
| 2010/0136496 A1* | 6/2010 | Kashihara et al. ........... 431/285 |
| 2010/0170216 A1 | 7/2010 | Venkataraman et al. |
| 2010/0170219 A1 | 7/2010 | Venkataraman et al. |
| 2010/0170251 A1* | 7/2010 | Davis et al. .................... 60/740 |
| 2010/0170252 A1* | 7/2010 | Venkataraman et al. ....... 60/742 |
| 2010/0170254 A1 | 7/2010 | Venkataraman et al. |
| 2010/0174466 A1 | 7/2010 | Davis, Jr. et al. |
| 2010/0223930 A1* | 9/2010 | Chila .............................. 60/752 |
| 2010/0229557 A1* | 9/2010 | Matsumoto et al. ........... 60/737 |
| 2010/0242482 A1* | 9/2010 | Kraemer et al. ............... 60/746 |
| 2011/0016869 A1* | 1/2011 | Iwasaki .......................... 60/752 |
| 2011/0056206 A1* | 3/2011 | Wiebe ............................ 60/740 |
| 2011/0067402 A1* | 3/2011 | Wiebe et al. ................... 60/740 |
| 2011/0289928 A1* | 12/2011 | Fox et al. ....................... 60/740 |
| 2011/0296839 A1* | 12/2011 | Van Nieuwenhuizen et al. ............................ 60/737 |

\* cited by examiner

LATE LEAN INJECTION SYSTEM TRANSITION PIECE

BACKGROUND OF THE INVENTION

The subject matter disclosed herein relates to turbines and, in particular, to late lean injection systems associated with gas and steam turbines.

Currently, some gas turbine engines fail to operate at high efficiencies and produce undesirable air polluting emissions. The primary air polluting emissions usually produced by turbines burning conventional hydrocarbon fuels are oxides of nitrogen, carbon monoxide and unburned hydrocarbons. Since oxidation of, e.g., molecular nitrogen in gas turbine engines is dependent upon a high temperature in the combustor and the residence time for the reactants at the high temperature within the combustor, a level of thermal NOx formation is reduced by maintaining the combustor temperature below the level at which thermal NOx is formed or by limiting the residence time for the reactants at the high temperatures such that there is insufficient time for the NOx formation reactions to progress.

One temperature controlling method involves the premixing of fuel and air to form a lean mixture thereof prior to combustion. However, it has been seen that, for heavy duty industrial gas turbines, even with the use of premixed lean fuels, the required temperatures of the combustion products are so high that the combustor must be operated with peak gas temperatures in the reaction zone that exceed the thermal NOx formation threshold temperature, resulting in significant NOx formation.

BRIEF DESCRIPTION OF THE INVENTION

According to one aspect of the invention, a late lean injection system transition piece includes a flowsleeve interface extending circumferentially around a transition interior. Also included is an impingement sleeve mounting surface extending circumferentially around the transition interior. Further included is a plurality of fuel injectors integrated substantially within the transition piece and disposed between the flowsleeve interface and the impingement sleeve mounting surface. Yet further included is an inner surface extending circumferentially around the transition interior, wherein the inner surface is spaced radially inward of the flowsleeve interface and the impingement sleeve mounting surface.

According to another aspect of the invention, a late lean injection system transition piece includes an outer surface having a forward side and an aft side. Also included is a flowsleeve interface disposed relatively on the forward side of the outer surface. Further included is an impingement sleeve mounting surface disposed relatively on the aft side of the outer surface. Yet further included is an inner surface spaced radially inward of the outer surface, wherein the inner surface extends circumferentially around a liner. The late lean injection system transition piece also includes a plurality of fuel injectors which are integrated substantially within the transition piece, wherein each of the plurality of fuel injectors extend from proximate the outer surface to the inner surface.

According to yet another aspect of the invention, a gas turbine engine includes a late lean injection compatible combustor having a combustor interior. The gas turbine engine also includes a turbine and a transition piece surrounding a transition interior, wherein the transition piece operably couples the combustor and the turbine. The transition piece includes a flowsleeve interface extending circumferentially around the transition interior. The transition piece also includes an impingement sleeve mounting surface extending circumferentially around the transition interior. The transition piece further includes a plurality of fuel injectors integrated substantially within the transition piece and disposed substantially between the flowsleeve interface and the impingement sleeve mounting surface.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
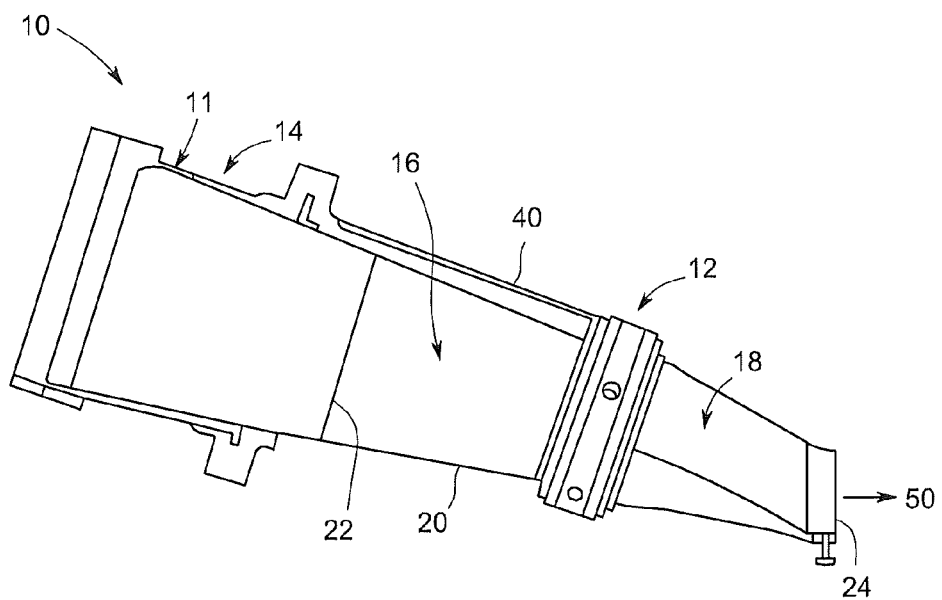
FIG. 1 is a side, cross-sectional view of a turbine engine having a late lean injection system with a transition piece disposed thereon.

Referring to FIG. 1, a gas turbine engine 10 is illustrated and includes a head end 11 having a first interior 16 in which a first fuel supplied thereto by a fuel circuit is combustible, a compressor (not illustrated) by which inlet air is compressed and provided to at least the head end 11 and a transition piece 12 and a turbine 50, including rotating turbine blades, into which products of at least the combustion of the first fuel are receivable to power a rotation of the turbine blades. The transition piece 12 is configured to, at least in part, operably couple the head end 11 and the turbine 50. The gas turbine engine 10 also includes a transition interior 18 in which a second fuel supplied thereto by the fuel circuit and the products of the combustion of the first fuel are combustible. As shown, the head end 11 and the transition piece 12 combine with one another to generally form a combustor 14, which may have various configurations.

Irrespective of the head end 11 configuration, it is understood that versions of the configurations may be late lean injection (LLI) compatible. An LLI compatible combustor is any combustor with either an exit temperature that exceeds 2200° F. or handles fuels with components that are more reactive than methane.

Figure 2:
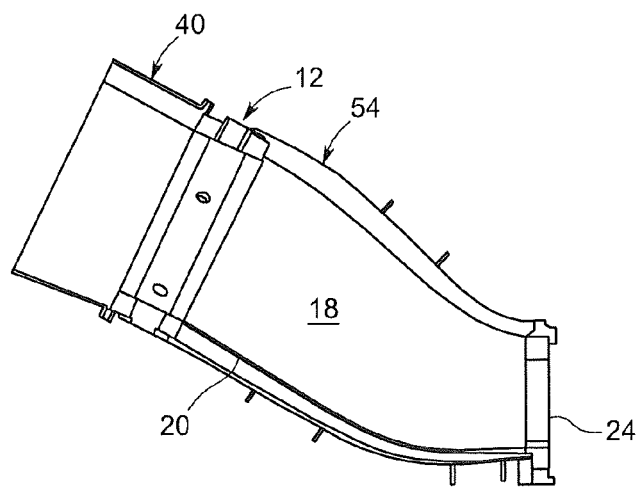
FIG. 2 is a side, cross-sectional view of a transition interior with the transition piece disposed thereon.

Referring to FIG. 2, the first interior 16 and the transition interior 18 are surroundably defined by a liner 20 that extends from the head end 11 in a direction substantially toward the turbine 50. The liner 20 includes a first end 22 located proximate the head end 11 and a second end 24 located proximate the turbine 50 and may take on numerous longitudinal contours as the liner extends from the first end 22 to the second end 24. The liner 20 may slightly curve continuously from the first end 22 to the second end 24, may curve slightly for only portions between the first end 22 and the second end 24, may extend in a substantially straight direction, or may comprise segmented portions, where the overall longitudinal direction of the liner 20 comprises any combination of the curvilinear paths described above. The transition piece 12 is situated proximate the perimeter of the liner 20 at an axial location that is typically closer in proximity to the second end 24 of the liner 20 than the first end 22 of the liner 20.

Figure 4:
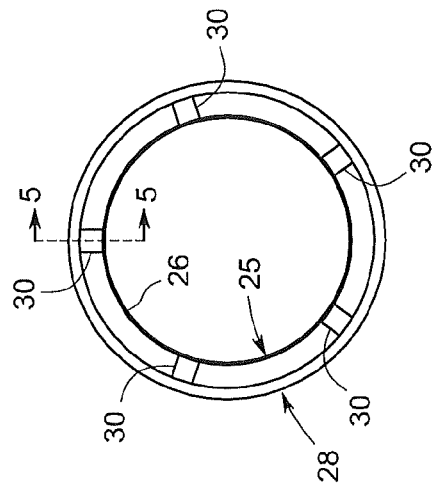
FIG. 4 is an elevational front view of the transition piece.
Figure 3:
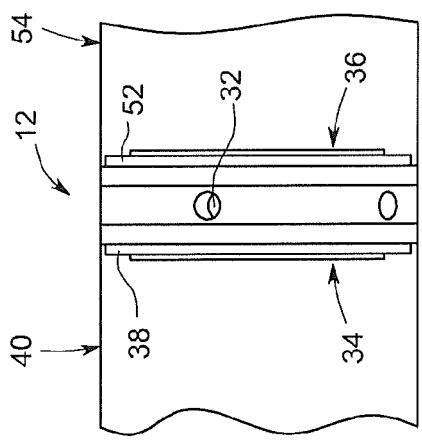
FIG. 3 is an elevational side view of the transition piece of the turbine engine.
Figure 5:
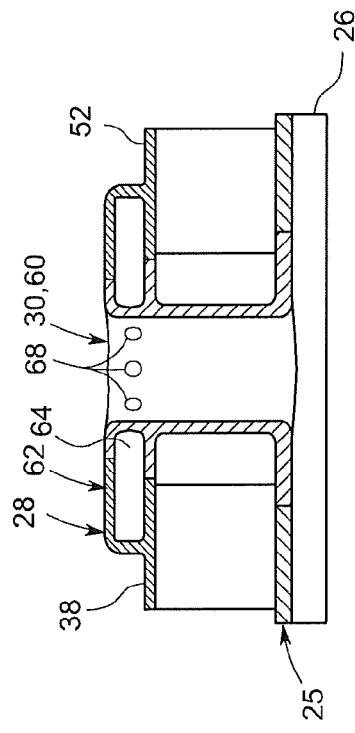
FIG. 5 is a partial, side, cross-sectional view of the transition piece taken along line V-V of FIG. 4.

Referring to FIGS. 3-5, the transition piece 12 includes an inner surface 25 having an inner wall 26 that forms an inner diameter of the transition piece 12. The liner 20 is configured to fit within the inner wall 26 of the inner surface 25 and an interface may be employed to facilitate engagement and/or sealing between the liner and the inner wall 26 of the transition piece 12. One example of such a sealing interface is a hula seal, but other interfaces may be employed for particular applications. In the case of the hula seal described above, the hula seal comprises an array of bowed spring leaves that allow for axial sliding and compliance between the inner wall 26 and the liner 20, both radially and angularly. By surrounding, at least in part, the liner 20, the inner surface 25 extends circumferentially around the transition interior 18 that is defined by the liner 20.

The transition piece 12 also includes an outer surface 28 that is spaced radially outward of the inner surface 25. The inner surface 25 and the outer surface 28 may comprise a solid component, where there is little to no space between the inner surface 25 and the outer surface 28. In this event the outer surface 28 includes an aperture 32 that extends radially inward toward the inner surface 25 and the liner 20. Alternatively, the inner surface 25 and the outer surface 28 may be substantially distinct components that are radially spaced from one another. In this configuration, the inner surface 25 and the outer surface 28 may be substantially connected by a plurality of housings 30 that include the aperture 32.

The outer surface 28 also includes a forward side 34 that is closer in proximity to the head end 11 than the turbine 50 and an opposite side referred to as an aft side 36 that is closer in proximity to the turbine 50 than the head end 11. Located on, or partially defined by, the forward side 34 of the outer surface 28 is a flowsleeve interface 38, such as a flange. The length of the flowsleeve interface 38 may vary depending on the application requirements. A flowsleeve 40 is included to at least partially circumferentially surround the liner 20 at a region proximate the forward side 34 of the outer surface 28. The flowsleeve interface 38 facilitates an operable connection between the flowsleeve 40 and the transition piece 12. Such an operable connection may, for example, be in the form of a mechanical connection via a piston ring, however, it is conceivable that numerous other techniques may be employed to properly connect the flowsleeve 40 with the transition piece 12, such as welding or other mechanical fastening techniques. Located on, or partially defined by, the aft side 36 of the outer surface 28 is an impingement sleeve mounting surface 52, such as a flange. An impingement sleeve 54 is included to at least partially circumferentially surround the liner 20 at a region proximate the aft side 36 of the outer surface 28. The impingement sleeve mounting surface 52 facilitates an operable connection between the impingement sleeve 54 and the transition piece 12. Such an operable connection may be made by a variety of mechanical or chemical fasteners or methods, as is the case for the aforementioned flowsleeve 40 to transition piece 12 operable connection. Both the flowsleeve interface 38 and the impingement sleeve mounting surface 52 may each have varying dimensions. Specifically, the flowsleeve interface 38 and/or the impingement sleeve mounting surface 52 may extend axially, with respect to the combustor 14, in order to provide a suitable mounting area for the flowsleeve 40 and the impingement sleeve 54, respectively.

A plurality of fuel injectors 60 are each integrated with or structurally supported by the plurality of housings 30 that extend radially within the transition piece 12 from substantially the outer surface 28 to the inner surface 25 of the transition piece 12. The plurality of fuel injectors 60 extend into the transition interior 18 to varying depths. That is, the fuel injectors 60 are each configured to supply the second fuel (i.e., LLI fuel) to the transition interior 18 by, e.g., fuel injection in a direction that is generally transverse to a predominant flow direction through the transition interior 18. Typically, as illustrated, the plurality of fuel injectors 60 will be disposed in a single axial circumferential stage that includes multiple currently operating fuel injectors 60 respectively disposed around a circumference of a single axial location of the transition piece 12. It is also conceivable that the plurality of fuel injectors 60 may be situated in a single axial stage, multiple axial stages, or multiple axial circumferential stages. A single axial stage includes a currently operating single fuel injector 60. A multiple axial stage includes multiple currently operating fuel injectors 60 that are respectively disposed at multiple axial locations. A multiple axial circumferential stage includes multiple currently operating fuel injectors 60, which are disposed around a circumference of the transition piece 12 at multiple axial locations thereof. In so doing, conditions within the combustor 14 and the transition interior 18 are staged to create local zones of combustion.

Each of the plurality of fuel injectors 60 and/or housings 30 may be operably coupled with a fuel manifold 62 that is configured to inject fuel into the respective fuel injectors 60 in a manner that mixes the fuel with the air flowing radially inward through the fuel injectors 60. Fuel may be injected through one or more fuel apertures 68 within the fuel injectors 60 and/or housings 30. The fuel manifold 62 includes one or more bosses 64 that connect from the fuel manifold 62 to the transition piece 12 at desired locations of fuel injection. It should be appreciated that alternative fuel and air mixing geometries and configurations may be employed in the plurality of fuel injectors 60 and should not be seen as limited to those illustrated.

Advantageously, the late lean injection system transition piece 12 provides the ability to reduce undesirable emissions generated during the combustion process, while providing flexibility to the overall combustor 14. Late lean injection (LLI) can also allow for an injection of multiple gas streams, including alternate gases, such as refinery gases, into the transition interior 18 that non-LLI combustors are generally unable to handle. Highly reactive gases, such as refinery gases, typically cannot be handled by premixed combustors due to the concern for undesirable flameholding in the premixers. Refinery gases on the other hand, which may or may not be blended with natural gases can, in certain cases, be injected directly into the transition interior 18 without such problems, especially where the fuel injectors 60 are tolerant of flameholding. Additionally, where the refinery gases are injected into the transition interior 18, it is understood that flameholding sensitive premixers can be employed at the head end 11 to prevent or substantially reduce the likelihood of flameholding incidents.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gas turbine engine comprising:
    a late lean injection compatible combustor having a combustor interior;
    a turbine; and
    a transition piece surrounding a transition interior, wherein the transition piece operably couples the combustor and the turbine, wherein the transition piece comprises:
        an inner surface extending circumferentially around the transition interior,
        an outer surface spaced radially outward from the inner surface,
        a flowsleeve interface extending circumferentially around the transition interior,
        an impingement sleeve mounting surface extending circumferentially around the transition interior downstream from the flowsleeve interface,
        a fuel manifold axially positioned between the flowsleeve interface and the impingement sleeve mounting surface, and
        a plurality of fuel injectors integrated substantially within the transition piece and disposed axially between the flowsleeve interface and the impingement sleeve mounting surface, each fuel injector having
        an air aperture extending radially inward from the outer surface of the transition piece to the inner surface of the transition piece for flowing air from radially outside the transition piece to the transition interior, and
        one or more fuel apertures directly connecting the fuel manifold and the air aperture.

2. The gas turbine engine of claim 1, wherein each of the plurality of fuel injectors extends from proximate the transition piece outer surface to the transition piece inner surface.

3. The gas turbine engine of claim 2, wherein a liner defines the transition interior and is operably engaged with the transition piece inner surface.

4. The gas turbine engine of claim 1, wherein the fuel manifold extends circumferentially around the transition piece.

5. The gas turbine engine of claim 4, wherein the fuel manifold comprises at least one boss that at least partially facilitates an operable connection between the fuel manifold and the transition piece.

6. A late lean injection system transition piece for a gas turbine engine, the late lean injection system transition piece positioned downstream from a combustor interior of the gas turbine engine, the late lean injection system transition piece comprising:
    an inner wall defining an inner diameter of the late lean injection system transition piece;
    an outer wall spaced radially outward from the inner wall, the outer wall defining a flowsleeve interface and an impingement sleeve mounting surface, the flowsleeve interface axially spaced apart from the impingement sleeve mounting surface, the flowsleeve interface and the impingement sleeve mounting surface extending circumferentially around the inner wall;
    a fuel manifold extending circumferentially around the late lean injection system transition piece, the fuel manifold axially positioned between the flowsleeve interface and the impingement sleeve mounting surface; and
    a plurality of fuel injectors disposed axially between the flowsleeve interface and the impingement sleeve mounting surface, each fuel injector having
        an air aperture extending radially inward for flowing air from radially outside the late lean injection system transition piece through the inner wall, and
        one or more fuel apertures for supplying fuel from the fuel manifold directly to the air aperture.

7. The late lean injection system transition piece of claim 6, wherein the plurality of fuel injectors are disposed about a circumference of the late lean injection system transition piece.

8. The late lean injection system transition piece of claim 6, wherein the fuel manifold comprises at least one boss that at least partially facilitates an operable connection between the fuel manifold and the late lean injection system transition piece.

9. The late lean injection system transition piece of claim 6, wherein the flowsleeve interface is located on a forward side of the late lean injection system transition piece.

10. The late lean injection system transition piece of claim 6, wherein the impingement sleeve mounting surface is located on an aft side of the late lean injection system transition piece.

11. The late lean injection system transition piece of claim 6, wherein the plurality of fuel injectors are disposed at multiple axial locations of the late lean injection system transition piece.

12. The late lean injection system transition piece of claim 6, wherein the plurality of fuel injectors connect the inner wall and the outer wall of the late lean injection system transition piece.

13. A gas turbine engine comprising:
    a flowsleeve extending circumferentially around a combustor interior;
    an impingement sleeve extending circumferentially around a transition interior downstream from the combustor interior; and
    a late lean injection system transition piece comprising:
    an annular inner wall;
    an annular outer wall spaced radially outward from the inner wall, the outer wall defining a fuel manifold extending circumferentially around the late lean injection system transition piece;
    a flowsleeve interface axially spaced apart from an impingement sleeve mounting surface, the flowsleeve interface extending axially to provide a mounting area for the flowsleeve, the impingement sleeve mounting surface extending axially to provide a mounting area for the impingement sleeve; and
    a plurality of fuel injectors disposed axially between the flowsleeve interface and the impingement sleeve mounting surface, each fuel injector having an air aperture extending radially inward for flowing air from radially outside the late lean injection system transition piece through the inner wall, and
    one or more fuel apertures for the receipt of fuel from the fuel manifold directly into the air aperture.

14. The gas turbine engine of claim 13, wherein the plurality of fuel injectors are disposed about a circumference of the late lean injection system transition piece.

15. The gas turbine engine of claim 13, wherein the flowsleeve interface is located on a forward side of the late lean injection system transition piece.

16. The gas turbine engine of claim 13, wherein the impingement sleeve mounting surface is located on an aft side of the late lean injection system transition piece.

17. The gas turbine engine of claim 13, wherein the plurality of fuel injectors are disposed at multiple axial locations of the late lean injection system transition piece.

18. The gas turbine engine of claim 13, wherein the plurality of fuel injectors are disposed circumferentially about the late lean injection system transition piece at multiple axial locations of the late lean injection system transition piece.

19. The gas turbine engine of claim 13, wherein the plurality of fuel injectors connect the inner wall and the outer wall of the late lean injection system transition piece.

20. The gas turbine engine of claim 13, wherein the air aperture extends radially between the outer wall and the inner wall.

\* \* \* \* \*